United States Patent
Bujon et al.

(10) Patent No.: US 6,589,428 B1
(45) Date of Patent: Jul. 8, 2003

(54) WASTE WATER TREATMENT USING ACTIVATED SLUDGE PROCESS

(75) Inventors: Bruno Bujon, Chatou (FR); Philippe Caulet, Bailly (FR); Jean-Pierre Philippe, Herblay (FR); Patrice Chatellier, Paris (FR)

(73) Assignee: Suez Lyonnaise des Eaux, Nanterre Cedex (FR)

( * ) Notice: Subject to any disclaimer, the term of this patent is extended or adjusted under 35 U.S.C. 154(b) by 0 days.

(21) Appl. No.: 09/806,938
(22) PCT Filed: Sep. 29, 1999
(86) PCT No.: PCT/FR99/02316
§ 371 (c)(1),
(2), (4) Date: May 22, 2001
(87) PCT Pub. No.: WO00/20344
PCT Pub. Date: Apr. 13, 2000

(30) Foreign Application Priority Data

Oct. 6, 1998 (FR) .............................................. 98 12501

(51) Int. Cl.$^7$ ................................................. C02F 3/00
(52) U.S. Cl. ....................... 210/739; 210/744; 210/104; 210/138; 210/143; 210/197
(58) Field of Search ......................... 210/626, 739–746, 210/104, 138, 143, 197

(56) References Cited

U.S. PATENT DOCUMENTS

| | | | | |
|---|---|---|---|---|
| 4,897,196 A | * | 1/1990 | Copa et al. .................. | 210/616 |
| 5,081,531 A | * | 1/1992 | Parker .................... | 375/240.25 |
| 6,254,778 B1 | * | 7/2001 | Chudoba et al. ............ | 210/197 |
| 6,336,177 B1 | * | 1/2002 | Stevens ....................... | 711/170 |
| 2002/0133831 A1 | * | 9/2002 | Dove et al. .................... | 800/8 |

OTHER PUBLICATIONS

Derwent Accession No. 1986–103654, "Circuit fall–back method . . . ", ("HITACHI"), 1999.*

* cited by examiner

Primary Examiner—Chester T. Barry
(74) Attorney, Agent, or Firm—Connolly Bove Lodge & Hutz LLP

(57) ABSTRACT

Process for controlling the retention time of the sludge undergoing clarification in a process for treating wastewater by activated sludge comprising a recirculation of the activated sludge from the clarification stage into the biological basins, characterized in that the rate of sludge recirculation ($Q_r$) is varied so as to maintain a constant recirculated sludge concentration ($C_r$) while at the same time guaranteeing a retention time (RT) of the sludge undergoing clarification of less than a critical value ($RT_{max}$).

12 Claims, 9 Drawing Sheets

(*AERATION/STIRRING NON-DISSOCIATION)

WASTE WATER TREATMENT USING ACTIVATED SLUDGE PROCESS

FIELD OF THE INVENTION

The present invention relates to improvements to the treatment of wastewater using activated sludge processes. It relates more particularly to a process and to a plant for controlling the retention time of the sludge undergoing clarification in a process for the treatment of wastewater by activated sludge comprising a recirculation of the activated sludge from the clarification stage to the aeration stage.

BACKGROUND OF THE INVENTION

It is known that in such activated sludge processes, the recirculation of the sludge is a significant component in the overall operation of purification plants. The role of the secondary clarifiers consists in separating the sludge from the treated water, and to do this a sludge-concentrating stage is essential in the structure. This concentrating phase requires a retention time imposed on the sludge in the clarifier, and, if this retention time is not controlled, the process drifts towards malfunction logic.

Too long a retention time firstly results in anoxia conditions, with an immediate effect of potential denitrification and the appearance of froth on the surface of the clarifiers. Secondly, the sludge comes into anaerobic conditions, the repercussions of which are often disastrous on the water system and the treatment of the sludge since the development of filamentous microorganisms is favoured, which causes, over the entire plant, foaming problems and problems of poor flock settling (a rise in the Mohlman index). The risk of sludge egress is t hen increased in the event of a hydraulic surge. In addition, anaerobic conditions are completely incompatible with biological dephosphatizing processes, and in this case the release of phosphorous into the clarifier results in the discharges being immediately off-specification. These events are thus characteristic of a major malfunction of the water system. In parallel, and from a direct economic standpoint, the sludge treatment is not optimized when the flock-settling properties are poor, whatever the treatment system involved. The operating times of the equipment of the sludge treatment system are lengthened, the solids contents are reduced and, immediately, the volumes of sludge extracted are increased for the same mass of treated dry matter.

In the clarification stage, the retention time of the sludge must therefore remain limited, with the risk of causing malfunctions in the water treatment. This limit is about 2 hours in the case of activated sludge processes operating with prolonged aeration. It is less in the case of moderate or high load conditions.

On the other hand, too short or variable a retention time for sludge under clarification may also be a limiting factor in the case of sludge treatment systems. This is because it gives rise to a sludge concentration not suitable for certain thickening and dehydrating structures when the sludge is extracted from the recirculation line. This is generally the case for small-sized and medium-sized plants equipped with structures for thickening by draining. The dilution of the sludge entering this type of equipment results in insufficient capture rates or in the need for excessive dosing with flocculating polymer, resulting in risks of blockage. variations in load on these conditioning apparatuses often result in malfunctions, such as creep or blockage, which are connected with the modifications in the operating conditions predefined during the initial set-up operations. The minimum permitted concentration on the draining screens or tables is about 6 g/l. The variations in loads withstood by this type of equipment are about 10 to 20%. These conditions on the concentration, which corresponds to the concentration encountered in the sludge well, are directly connected with a constraint on the minimum retention time in the clarification stage. This minimum retention time itself depends on the sludge settleability properties.

Maintaining and controlling a mean retention time of the sludge undergoing clarification are therefore of prime importance for ensuring quality, reliability and economy of the treatment. This is indeed the technical problem that the present invention aims to solve.

In the technology of water treatment with regard to the activated-sludge recirculation function, two types of recirculation in a purification plant may be identified:

recirculation which returns the sludge from the clarifier into the aeration basin: the objective is to recycle part of the biological sludge so as not to impoverish the purifying mass of the aeration basin;

recirculation of mixed liquors which exist in the plants having an anoxia basin and an aeration basin; they recover the sludge from the aeration basin rich in nitrates in order to bring it into the anoxia region so that the denitrification can reduce the contents of the discharges.

The process forming the subject-matter of the present invention relates to the recirculation of activated sludge from the clarifier into the aeration basin. Given that the various arrangements for the activated sludge to be recirculated from the clarifier into the aeration basin form part of the conventional technical knowledge of those skilled in the art in the water treatment field, they will not be described. The reader may refer for this purpose to Mémento Technique de l'Eau, Ninth Edition (1989).

The general principle of managing the recirculation of activated sludge in water treatment will now be explained.

The objectives of management suitable for sludge recirculation must satisfy the criteria below:

to prevent the sludge in the clarifier from undergoing anaerobiosis in order to reduce any risk of malfunction;

to adapt the operating mode of the plant to the conditions encountered in operation (sludge masses in the system, sludge-settling properties, rain showers, etc.), so as in particular to prevent sludge bed egress;

to manage the distribution of the total mass of sludge between the biological basin and the clarifier in order to make the biological treatment reliable.

Reference is made to FIG. 1 of the appended drawings, which is a diagram illustrating the construction of the sludge flow balance and in this diagram the aeration basin is represented by 1 and the clarifier by 2.

The amount of recirculation of the sludge from the clarifier 2 into the aeration basin 1 is by definition the ratio of the rate of recirculation to the throughput of the plant:

$$\tau_{rec} = Q_r/Q_t$$

where $\tau_{rec}$ denotes the rate of recirculation ($0 < \tau_{rec} < 1$)

$Q_r$ denotes the rate of recirculation (m$^3$/h) and $Q_t$ denotes the throughput (m$^3$/h).

This amount of recirculation is defined by the conditions encountered on the site. There must be an overall balance between the sludge flows into and out of the clarifier:

$$(Q_t + Q_r) \times C_{as} = Q_r \times C_r$$

where $C_{as}$ is the sludge concentration (g/l) in the aeration basin and $C_r$ is the sludge concentration (g/l) in the recirculation line.

The storage term is neglected here, just like the treated-water discharge outflow.

This equation is used to calculate the degree of recirculation $\tau_{rec}$:

$$\tau_{rec}=Q_r/Q_t=C_{as}/(C_r-C_{as})$$

$C_{as}$ is an operational parameter that can be measured directly in the aeration basin. As regards $C_r$, this must be controlled so as to meet the requirements on the retention time of the sludge in the clarifier since it has been seen, empirically, that the sludge retention time is linked to the Mohlman index, representative of the sludge-settling and thickening properties, and to the sludge concentrations in the aeration basin and in the recirculation line. The following correlation has been established between these variables:

$$RT/60=(C_rMI/1000)^3-(C_{as}MI/1000)^3$$

where RT is the retention time (in minutes) of the sludge undergoing clarification and MI is the Mohlman index (ml/g).

This formula is the reference relationship for the automated recirculation management logic tool. It is based on a formula of the same type published by ATV (ATV Standard, A 131. (1991); "Dimensioning of single-stage activated sludge plants upwards from 5 000 total inhabitants and population equivalents" Abwassertechnische Vereinigung e.V., St. Augustin):

$$C_r = \frac{1000\sqrt[3]{RT/60}}{MI}$$

If the measurement of the Mohlman index is not representative of the fact of the lack of sludge settling, a settling index $I_s$ may be defined for safety protection, and then used in these formulae.

$I_s$ is the undiluted settling index (ml/g).

In practice, the maximum permitted retention time of the sludge undergoing clarification is only dependent on the mass charge of the plant. As an indication, it is about 120 minutes for a low charge. It may be reduced to 40 minutes for high charges.

For a given charge, since the settling index and the sludge concentration in the aeration basin are operating parameters, it is thus possible to define a setpoint for the sludge concentration in the recirculation line which overall satisfies, with respect to the maximum permitted retention time in the clarifier, the constraint associated with making the water treatment reliable.

The amount of recirculation defined will thus be a function of the sludge concentration in the aeration basin and, indirectly, of the sludge settling index and of the mass charge of the plant, that is to say of the operating conditions encountered on the site. This amount of recirculation can therefore be expressed as:

$$\tau_{rec}=Q_r/Q_t=C_{as}/(C_{r,set}-C_{as})$$

where $$C_{r,set}=1000/MI(RT_{max}/60+(C_{as}MI/1000)^3)^{1/3};$$

$C_{r,set}$ is the setpoint for the sludge concentration (g/l) in the recirculation line; and $RT_{max}$ is the maximum permitted retention time (in minutes) of the sludge undergoing clarification.

In fact, to be rigorous it would be necessary to complete the balance equation with the flow of extracted sludge into the sludge treatment system. This quantity may sometimes be predominant for the outflows in small plants:

$$(Q_t+Q_r)\times C_{as}=(Q_r+Q_{ext})\times C_{r,set}$$

where $Q_{ext}$ is the extraction flow rate (m³/h).

The calculated rate of recirculation is then:

$$Q_r=[(Q_t\times C_{as})-(Q_{ext}\times C_{r,set})]/(C_{r,set}-C_{as}).$$

The management methods known at the present time for recirculating sludge in the field of water treatment by activated sludge will now be explained.

In general, two management methods are used:

the recirculated flow rate is constant and represents from 100 to 150% of the intended daily wastewater throughput of the plant. Above a limiting throughput threshold, the recirculation equipment may have to be forced;

the rate of recirculation is slaved in a proportional manner to the incoming flow rate.

In order to proportion the rates of recirculation, the operation of the equipment is continuous at a fixed rate, or syncopated by slaving to a clock or to a cyclic metering device. In large plants, specific regulations exist which use a combination of sensors for the throughput, the rate of recirculation, the weight of sludge in the aeration basin and in the recirculation line, the height of the sludge blanket and the output turbidity.

A well-managed recirculation favours good quality of the sludge and clarification of the water. The sludge must not be stored in the clarifier in order to prevent fermentation. The operating periods must always be longer than the rotation time of the scraper bridge of the clarifier or at least managed on the basis of non-harmonic frequencies.

If the sludge concentration is adapted and if the recirculation is well managed, the sludge blanket is not visible and cannot be detected with the Secchi disc: the sludge blanket is at most 1 m in depth.

These management methods according to the prior art have the following drawbacks:

1—The conventional recirculation management methods—fixed or slaved flow rate—remain dependent on the definition of an average amount of recirculation and therefore on a control setting tied to the operating conditions. Too often, the actual amounts of recirculation are defined when designing and commissioning the plants. They are only rarely re-adjusted, with the exception of periods of malfunction (a typical example: a leak in the sludge bed is observed and the immediate reaction is to increase the recirculation. Unfortunately, this operating reaction occurs too late). One of the essential management rules might be to re-update the amounts of recirculation when a Mohlman index and/or sludge concentration measurement is made in the aeration basin and to modify the settings as a consequence. Apart from this main defect, managing the recirculation on the basis of a fixed flow rate has the drawback of not being good in taking account of the hydraulic events encountered. Peak management is rarely modified according to the daily regimes (working days or weekends) and the various seasonal regimes are treated in the same way (summer periods, rainy periods, temporary activities (grape harvesting, etc.)), and the forced operations actuated by rainy weather are blind to the history and to the environment of the event (sudden or uniform, short or persistent rainfall).

2—The management method slaved to the flow rate seems to be more suitable in this field. However, from a rigorous standpoint, it appears that the dynamics of sludge transfer in the aeration basin/clarifier system have not been taken into account hitherto. This is because the response of the system is slow and damped by buffer effects, and the reaction to a rapid event cannot be simply controlled by an action proportional to the excitation.

3—Finally, the method of controlling the recirculation equipment is ordinarily syncopated, and the modifications to the settings often result in a phase lag in the syncopating frequencies with the rotation time of the scraper bridge of the clarifier. The non-harmonic frequencies as they are known are no longer respected and the recirculated sludge always comes from the same regions of the bottom of the clarifier. This is because the scraper has a mainly destructuring action, since the relative compactness of the sludge blanket limits homogeneous recovery of the sludge by suction towards the sludge well. Passage of the scraper locally fluidifies the sludge blanket and encourages the recovery of freshly destructured sludge upon activating the recirculation pumps. For harmonic frequencies (15 minutes operation, 15 minutes stoppage for a bridge rotation time of 30 minutes for example), sludge recovery is effective only over part of the clarifier.

Unsuitable management of the sludge recirculation runs the risks mentioned below:

a)—Excessive Recirculation:

The risks run by excessive recirculation are too high a velocity in the internal "skirt" of the settler ("clifford") acting as a distributor of the flux to be treated (impeded settling) and an imbalance at the water/sludge interface: the rate of sludge pumping will be much higher than the particle settling velocity, thus creating a hydraulic short-circuit. In addition, excessively high rates of recirculation reduce the sludge concentrations in the recirculation line, which may place a limit on the feed for the sludge treatment system.

b)—Insufficient Recirculation:

The risks run as a consequence of insufficient recirculation are linked with possible uncontrolled denitrification and to the sludge moving to anaerobic conditions in the clarifier (release of phosphorus, promotion of the development of filamentous microorganisms and of foam, etc.). The clarifier is periodically converted into a sludge storer and thickener.

c)—Syncopated Recirculation with a Non-harmonic Frequency:

The risks are identical to those of insufficient recirculation, but in a less pronounced manner, by the creation of regions or unrecovered pockets of sludge, the retention time of which is long.

In the case of clarifiers with sucked bridges, the rate of recirculation must never be less than the rate of depriming of the siphon such that there is an imbalance in the load losses on the suction tubes (this depends intimately on the distribution of the sludge concentrations on the bottom).

BRIEF DESCRIPTION OF THE INVENTION

Given the fact that the existing strategies for managing the recirculation of activated sludge are not satisfactory, the objective of the present invention is to provide a process for the automated management of this recirculation, for the purpose of controlling the retention time of the sludge undergoing secondary clarification in activated-sludge processes. Its primary objective is to limit the retention time of the sludge in the clarifier to below a maximum limit, for the purpose of making the water treatment reliable. Its secondary objective is to facilitate the management of sludge treatment systems using, for example, draining equipment, by maintaining a constant concentration in the recirculation line.

Consequently, the subject of the present invention is a process for controlling the retention time of the sludge undergoing clarification in a process for treating wastewater by activated sludge comprising a recirculation of the activated sludge from the clarification stage into the biological basins, characterized in that the rate of sludge recirculation ($Q_r$) is varied so as to maintain a constant recirculated sludge concentration ($C_r$) while at the same time guaranteeing a retention time (RT) of the sludge undergoing clarification of less than a critical value ($RT_{max}$).

According to one method of implementing the invention, the rate of sludge recirculation ($Q_r$) is varied according to a signal representative of the throughput ($Q_t$) of water passing through the plant, so as to limit the retention time of the sludge in the clarification stage.

According to another method of implementation, when the validity of the signal representative of the throughput of water passing through the plant is not recognized, the recirculation of the sludge is controlled according to the fall-back method of managing the water treatment plant.

According to another method of implementing the process according to the invention, the rate of sludge recirculation ($Q_r$) is varied according to a signal representative of the sludge concentration ($C_r$) in the recirculation line, obtained from a sensor positioned in the recirculation line, this signal being delivered to an automated logic tool which varies the rate of recirculation ($Q_r$) according to the variation in the signal received, so as to keep the sludge concentration ($C_r$) in the recirculation line constant; in the event of doubt about the representativeness of the said signal, the sludge recirculation is controlled automatically according to a slaved management method whose objective is to limit the retention time of the sludge in the clarification stage, the said slaved management method being managed on the basis of the analysis of the values of the sludge concentration ($C_{as}$) in the biological basin and on the basis of the throughput ($Q_t$) of water passing through the plant.

According to another characteristic of the process according to the invention defined above, the volume of settled sludge is periodically measured so as to evaluate the sludge settling index ($I_s$) and the sludge concentration in the biological basin and to determine the setpoint values for the management controller.

According to the present invention, the automated logic tool for managing the sludge recirculation is designed so as:

to periodically update the average amount of sludge recirculation ($\tau_{rec}$) so as to adapt it to the conditions of the treatment plant, on the basis of the value of the sludge concentration ($C_{as}$) in the aeration basin and on the basis of the re-updated settling index ($I_s$);

to respond instantly to the hydraulic events and manage the reaction delays according to the response time of the clarifier/aeration basin system by being based on the variation in the throughput ($Q_t$); and keeping the sludge concentration ($C_r$) in the recirculation line constant.

The invention also relates to apparatuses for implementing the process defined above.

According to a first embodiment, this apparatus comprises:

sensors making it possible, respectively, to measure the throughput ($Q_t$);

means ensuring modulated control of the said rate of activated sludge recirculation ($Q_r$);

means for measuring the volume of the sludge that has settled and for evaluating the settling index ($I_s$) and the sludge concentration ($C_{as}$) in the biological basin;

a controller ensuring automated management of the recirculation, which comprises two main modules served by a common signal-input stage:

a first module providing the interface between the user and the controller and making it possible to display a concentration setpoint ($C_r$);

a second module forming the unit for controlling the recirculation flow rates and comprising:

a control logic tool for controlling the retention time of the sludge in the clarifier on the basis of the throughput ($Q_t$), in order to calculate a signal for controlling the rate of recirculation ($Q_r$);

a module for managing the safety actions of the logic tool for managing the recirculation means; and a stage involving the parameterization, reception, processing, analysis and validation of the signals coming from the sensors and logic indicators of the operation of the equipment in order to supply the said modules.

According to a second embodiment, this apparatus comprises:

sensors making it possible, respectively, to measure:

the sludge concentration ($C_r$) in the line for recirculating the activated sludge from the clarifier into the aeration basin;

the sludge concentration ($C_{as}$) in the aeration basin; and the throughput ($Q_t$);

means ensuring modulated control of the said rate of activated sludge recirculation ($Q_r$);

means making it possible to measure the volume of the sludge that has settled and to evaluate the settling index ($I_s$);

a controller ensuring automated management of the recirculation, which comprises three main modules served by a common signal-input stage:

a first module providing the interface between the user and the controller and making it possible to display a concentration setpoint ($C_r$);

a second module forming the unit for controlling the recirculation rates and which comprises:

a control logic tool ensuring control and regulation of the rate of recirculation ($Q_r$) on the basis of the measurement of the sludge concentration ($C_r$) in order to keep the recirculation concentration constant;

a control logic tool ensuring control of the retention time of the sludge in the clarifier on the basis of measurements of the sludge concentration ($C_{as}$) in the aeration basin and of the throughput ($Q_t$), in order to calculate a signal for controlling the rate of recirculation ($Q_r$);

a module for managing the safety actions of the logic tool for managing the recirculation means; and a third module for calculating the mass of sludge present in the clarifier/biological basin system for the purpose of fixing and setting the rate of extraction of the sludge; and a stage involving the parameterization, reception, processing, analysis and validation of the signals coming from the sensors and logic indicators of the operation of the equipment in order to supply the said modules.

As will have been understood, the process forming the subject-matter of the present invention allows the rate of recirculation to be varied so as to maintain a constant concentration of recirculated sludge, while at the same time guaranteeing a retention time of less than the critical value. One of its functions furthermore makes it possible to evaluate the total mass of sludge present in the system, so as to assist the management of the extractions. Finally, the safety detection provided by the controller prevents any possible drift in the quality of the sludge or in the components providing the recirculation function, and informs when exceptional maintenance operations are to be carried out.

The process forming the subject-matter of the invention makes it possible in particular to eliminate the risk of filamentous bacteria appearing from the sole fact of managing the secondary clarifiers. Thus, it makes the water treatment system reliable and makes it possible to optimize the performance of the sludge system by maintaining the quality of the sludge. Finally, the constancy of the extraction concentration and the possibility of renewing the predefined settings or of operating the equipment at any time make it possible to assist the operations relating to thickening by draining. The advantage of applying this automated management may be expressed in terms of operating costs:

Improvement in or maintenance of sludge quality, manifested by a low Mohlman index (increase in the capacity and reduction in the operating time of the sludge treatment equipment, improvement in the solids content and reduction in the volumes and in the costs of extracting the sludge produced, reactant metering, reduction in returns to the top, etc.).

Assistance in sludge treatment and elimination of draining malfunctions (organization of operating labour).

Conformity of the discharges (Water Agency Agreements and Premiums).

Prevention of malfunctions, especially under extreme operating conditions and during rain showers (organization of labour and elimination of malfunction handling costs).

Visual appearance of the clarifier.

Further features and advantages of the present invention will become apparent from reading the description given below with reference to the appended drawings which illustrate various methods of implementation and embodiments. In the drawings:

DETAILED DESCRIPTION OF THE INVENTION

Figure 1:
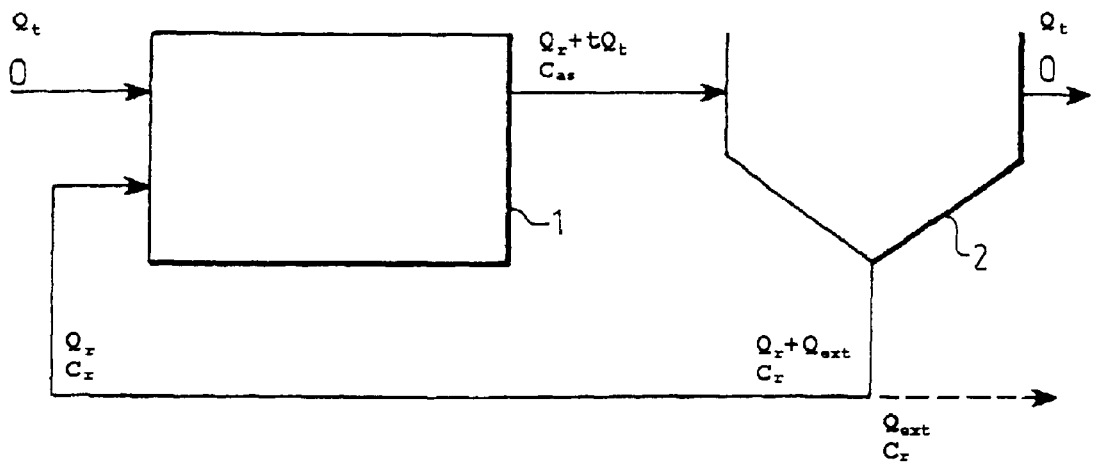
FIG. 1 is a diagram illustrating a water treatment plant to which the invention applies, this diagram having been used in part of the above preamble relating to the explanation of the general principle of sludge recirculation management.
Figure 2:
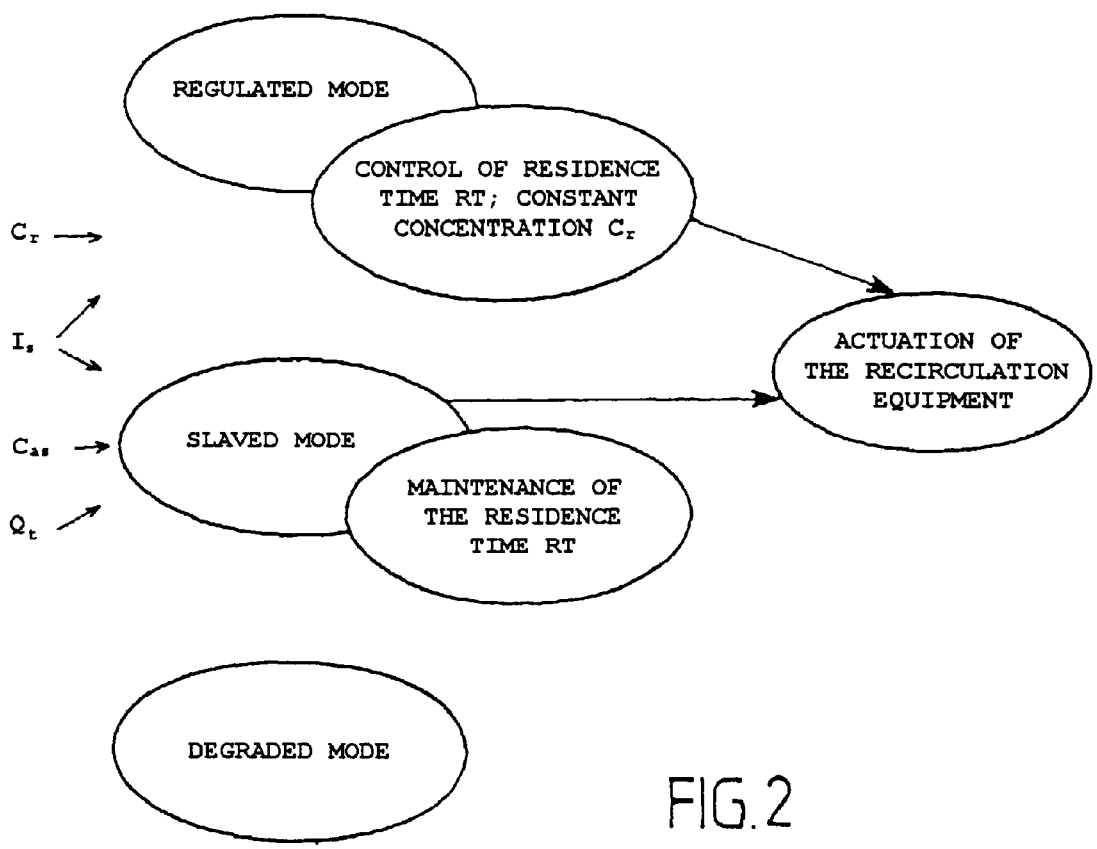
FIG. 2 is a diagram illustrating the method of operating the management logic tool used by the process according to the invention.

Referring to FIG. 2, the action of the controller used by the process and the apparatus forming the subject-matter of the present invention consists in varying the rate of sludge recirculation ($Q_r$) by acting on the recirculation equipment, that is to say on the pumps which are designed to recirculate the activated sludge. These pumps may be supplied at a variable frequency, by means of a converter, or at frequencies fixed by means of the mains. Preferably, a frequency converter will be used.

This action makes it possible to achieve a concentration setpoint value ($C_{r,set}$) which is dependent on the operating conditions of the site. The process according to the invention varies the rate of recirculation ($Q_r$) according to a "weight of recirculation sludge" signal ($C_r$) coming from a sensor located in the sludge well of the plant. Depending on the variation in the signal received, the automated logic tool will vary the rate of recirculation so as to maintain a recirculation concentration as constant as possible.

When a doubt arises as to the representativeness of the signal ($C_r$) delivered by the said sensor, the controller instantly switches to a slaved management mode. The single objective of this security-protected logic tool is to limit the retention time of the sludge in the clarifier. Constancy of the recirculation concentration is no longer guaranteed. This slaved mode is managed by analysing the values of the weight of sludge in the aeration basin ($C_{as}$) and the flow passing through the plant, that is to say the throughput ($Q_t$), only.

When the validity of the measurements from all the sensors is no longer recognized, the controller is in "degraded" mode and the recirculation is subject to the fold-back method of managing the plant.

The logic tool for the automated management of the sludge recirculation according to the present invention is therefore dependent on the operation of the sensors and of the periodic indication of the sludge settling index ($I_s$). This is the reason why according to the invention the volume of the sludge that has settled is periodically measured, for example once every eight days at most, making it possible to evaluate this settling index and therefore to determine the setpoint values for the controller in order to regulate the rate of recirculation most accurately.

Figure 3:
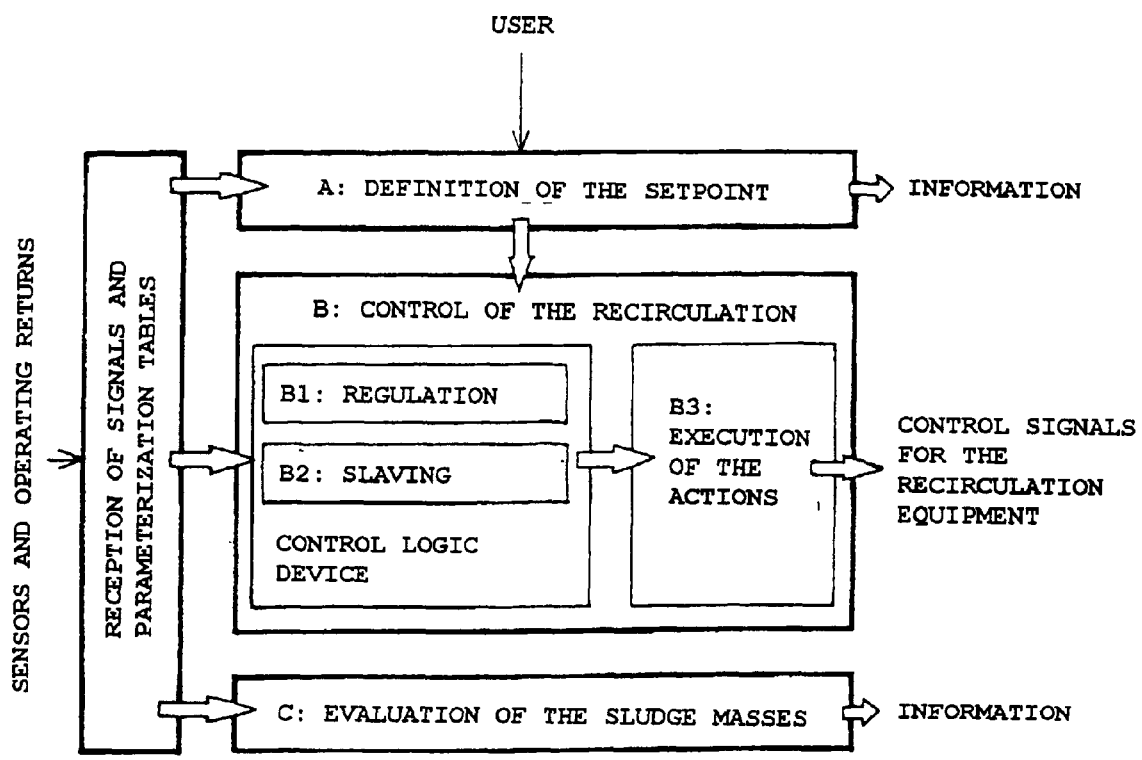
FIG. 3 illustrates, schematically, in a block diagram, the structure of the sludge recirculation management logic tool used by the invention.
Figure 4:
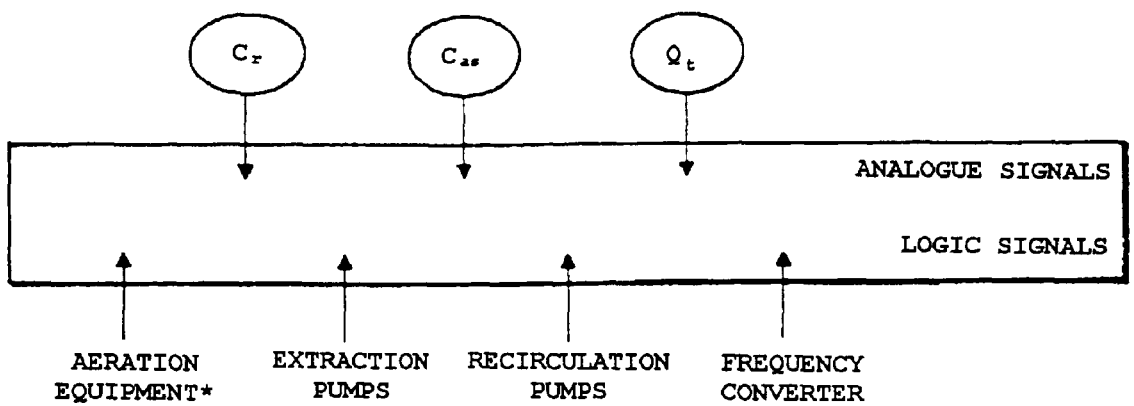
FIG. 4 illustrates schematically the stage of the plant according to the invention allowing the various modules of the management logic tool to be supplied.

Reference is now made to FIGS. 3 and 4 of the appended drawings illustrating, schematically, the structure of the automatic logic tool used in the process and the apparatus forming the subject-matter of the invention.

The automated recirculation management logic tool according to the invention is composed of three main modules, served by a common signal-input stage.

The module A is an interface between user and controller, which allows manual information about measurements and desired settings, verification of compatibility between process constraints and desired settings, and display of the operating data and information coming from the controller.

The module B is the unit for controlling the rates of recirculation. It is composed of two control logic tools B1 and B2, activated according to the availability of the information sources, and of a common mode of carrying out the actions B3 for controlling the recirculation equipment.

The control logic tool B1 operates in a regulation mode. Its objective is to maintain the recirculation concentration ($C_r$) to within ±1 g/l about the setpoint value, so as to guarantee the retention time of the sludge undergoing clarification and to facilitate the management of the extractions. The measurement of the sludge concentration in the recirculation line is used here to control and regulate the rate of recirculation ($Q_r$). This regulation allows automatic verification of the three principles of the logic tool for managing the process according to the invention which are explained below, namely the matching of the amounts of recirculation to the operating conditions, the management of the delays in reaction to the hydraulic events and the maintenance of a stable concentration in the recirculation line. This is the preferred management mode of the invention.

The logic tool B2 operates in a slaving mode. The measurements of the sludge concentration ($C_{as}$) in the aeration basin and of the throughput ($Q_t$) are used here to calculate a signal for controlling the rate of recirculation ($Q_r$). There is no control of the action exerted—it is thus a pure slaving mode. Its advantage lies in adapting the amounts of recirculation ($\tau_{rec}$) to the operating conditions and to the management of the delays in reaction to the major hydraulic events. According to the flow equilibrium principle, this mode of management by slaving ought to allow the sludge concentration ($C_r$) in the recirculation line to be maintained within a restricted range of variation. This slaving management mode constitutes the security-protected mode of managing the process of the invention and it corresponds to the objective of controlling the retention time in the clarification.

The mode of carrying out the actions B3 makes it possible to define the combinations of equipment to be used, and, as was seen above, the pumps used for recirculating the sludge from the clarifier into the aeration basin may be supplied at a variable frequency (converter) or at a fixed frequency (mains). The converter serves only one pump at a time, the others being shut down or with a fixed supply. The value of the flow control signal coming from the logic tools is expressed in m3/h and must be translated into a combination of equipment and into supply frequencies in order to achieve the rate of recirculation setpoint. The module B3 furthermore allows the security protection actions of the recirculation management logic tool to be managed.

Finally, the module C makes it possible to estimate the mass of sludge present in the aeration basin/clarifier system, which value is automatically updated for the operation. This information makes it possible to monitor or fix the sludge extraction rates in the plant. A quick estimate could be made from the value of the sludge concentration ($C_{as}$) in the aeration basin provided that the mass of sludge contained in the clarifier is negligible or obtainable by an equilibrium calculation. However, it is difficult to make such an estimate with certainty during the day, since these assumptions are not verified. On the one hand, the mass of sludge in the clarifier is not negligible in the daytime periods, more especially during major hydraulic events. On the other hand, its evaluation is not possible until an equilibrium flow has been reached, and the periodic variations in flow rate during the daytime move the plant into frequent transition regimes. The module C proposes to calculate the mass of sludge in the steady-state system automatically updated when an equilibrium flow has been defined.

Finally, the apparatus according to the invention furthermore includes (FIG. 4) a stage involving the parameterization, reception, analysis, processing and validation of signals coming from the sensors and returns of the operation make it possible to supply these various modules. The controller receives analogue information from the various sensors used (the signal relating to the sludge concentration ($C_r$) in the recirculation line, the signal representing the sludge concentration ($C_{as}$) in the aeration basin, the signal representing the throughput ($Q_t$)) and logic information relating to the operation of the equipment, such as the recirculation pumps, the extraction pumps, the converter and the aeration equipment.

It was specified above that, in order to satisfy the control of the retention time of the sludge undergoing secondary clarification and the assistance of the extractions, the automated sludge recirculation management logic tool according to the invention must comply with three major principles:

Periodic matching of the average amount of recirculation to the conditions encountered in the plant. This is because a variation over a range of 50 to more than 400% may be easily encountered over one year, since the Mohlman index or the total sludge mass varies over the site.

The instantaneous response to the hydraulic events and the management of the delays in reaction, depending on the response time of the clarifier/aeration basin system. This aspect is important for coordinating the phenomena of storing sludge in the clarifiers and of discharging it therefrom, and for preventing excessively long sludge accumulation resulting in anaerobic conditions.

Maintaining a constant sludge concentration in the recirculation line. This regularity makes it possible to optimize the operation of certain equipment of the sludge system operating in extended flow, when the recirculation and extraction lines are coupled.

These three principles will be explained below:

1—Matching of the amount of recirculation to the conditions encountered in the plant.

So as to make the water treatment reliable, it is important to periodically update the setpoint relating to the amount of recirculation ($\tau_{rec}$) in a manner suited to the operating conditions.

Apart from accidents (influx of hydrocarbons, of saline solutions, etc.), the dynamics of the variation in the settling index ($I_s$) is about 50 ml/g at most per week for low charges. The sludge concentration ($C_{as}$) in the aeration basin can vary quite rapidly from 0.2 to 0.6 g/l per day according to the charge of the plant, in the event of a breakdown in the extraction line or in the sludge treatment system.

This type of modification of the conditions may result in the need to significantly and quickly increase the amount of recirculation, mainly in the case of the combination of limiting conditions (high $C_{as}$ and high $I_s$). Otherwise, the amount of sludge recirculation will be too low and the retention times of the sludge undergoing clarification will increase, with the risk of initiating or sustaining a malfunction in the water treatment system.

Figure 5:
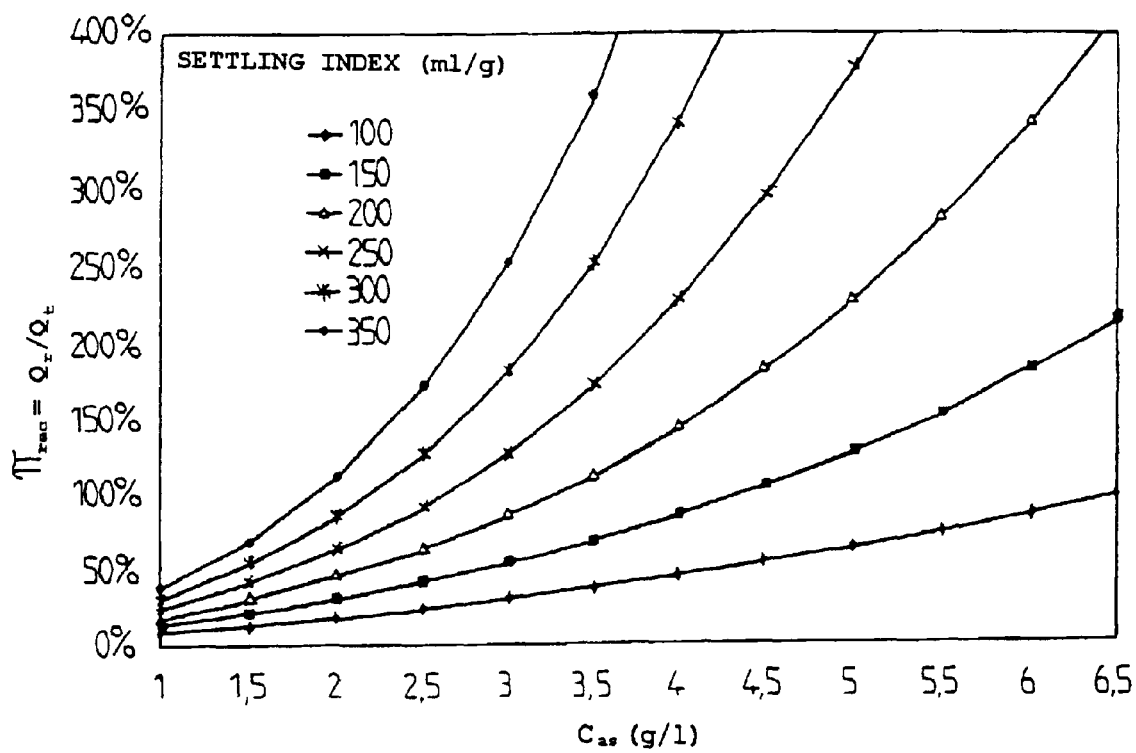
FIG. 5 is a curve illustrating the variation in the rate of sludge recirculation as a function of the operating conditions.

FIG. 5 illustrates the variation in the necessary amount of recirculation ($\tau_{rec}$) as a function of the operating conditions $C_{as}$ and $I_s$ for a constant mass charge (retention time of the sludge undergoing clarification: RT=120 minutes).

The information regarding the operating conditions is received, on the one hand, by the sensor for the concentration $C_{as}$ and, on the other hand, as a result of the updating of the $I_s$ measurement by the operators, consistent with the frequency of the self-checking tests and monitoring of the process. The amount of sludge recirculation is then automatically adapted in the controller, which, by observation, is rarely carried out when setpoints for manual settings are necessary.

2.—Response to hydraulic events and management of the delays in reaction.

When there is a major change in the hydraulic conditions in the plant, it is necessary to modify the response times of the actions taken. The calculation based on the notion of equilibrium is no longer valid in terms of instantaneous values or values delayed by one hour. The dynamics of sludge transfer between the various structures must be taken into account.

A significant increase in the throughput ($Q_t$) results in a gradual transfer of sludge into the secondary clarifier. The storage term in the balance of the flows of sludge undergoing clarification is no longer negligible. The significant volume of the aeration basin generates a buffer effect; there is a damping role on the rate of storage of sludge in the secondary clarifier. The large mass of sludge undergoing clarification, calculated from the notion of equilibrium, will be present only when the high hydraulic flow is maintained for several hours.

Figure 6:
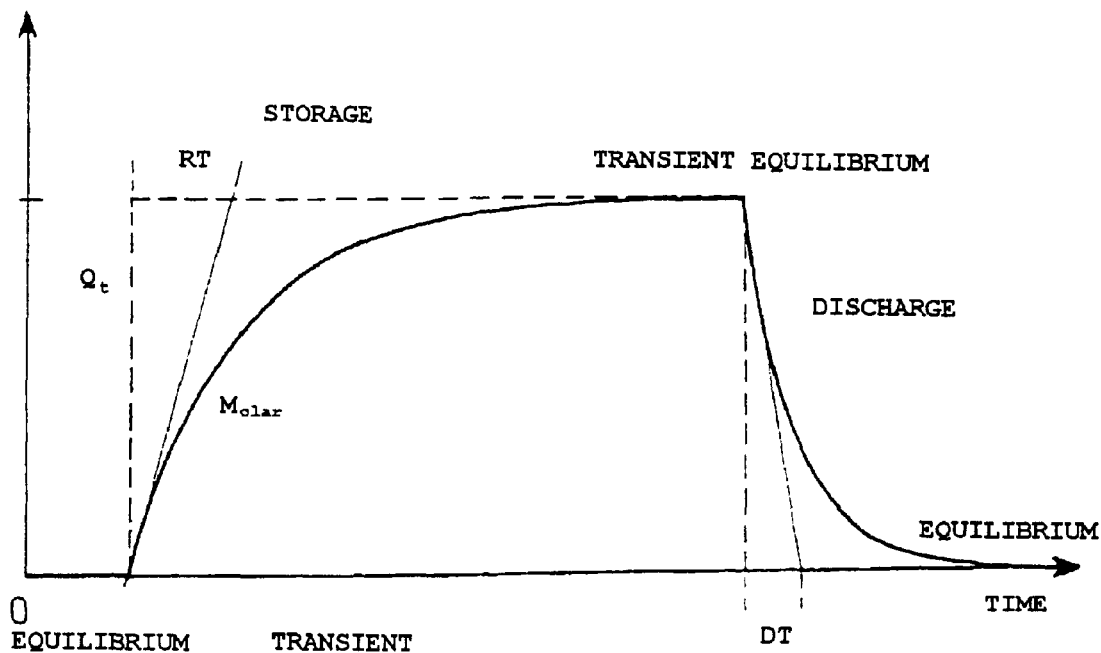
FIG. 6 is a curve illustrating the dynamics of the variation in the masses of sludge undergoing clarification.

FIG. 6 is a curve illustrating the dynamics of the variation over time of the mass of sludge undergoing clarification ($M_{clar}$)

Once this steady state has been established, a sudden reduction in the throughput ($Q_t$) does not allow immediate transfer of the sludge into the aeration basin. The discharge term in the balance of the flows of sludge undergoing clarification is not, here either, negligible. The sludge that has settled in the secondary clarifier is recovered at best at the maximum rates of recirculation and therefore is gradually discharged over several hours.

From a mathematical standpoint, it is possible to set up the equations for the balance of the incoming flow of sludge into the clarifier and the outgoing flow of sludge therefrom. What remains is that sedimentation models have to be used in order to simulate the distribution of sludge and the spatial and temporal variation in their concentrations in the sludge blanket. However, for the sake of simplification, it is possible to obtain a first-order differential equation representing the variation in the mass of sludge contained in the clarifier. This equation makes it possible to define response times of the system, these being characteristic of the establishment of steady states in the case of the distribution of the mass of sludge in the biological stage.

Thus, after increasing the hydraulic flow, the storage time (ST) is representative of the time needed to accumulate what is termed an equilibrium mass of sludge in the clarifier. Conversely, the discharge time (DT) is characteristic of the time required to discharge some of the sludge and to come to equilibrium after passing to a lower hydraulic flow. By definition, these values, (ST) and (DT), cannot be fixed for a site. They are dependent on the flow rates in the plant, on the availability of the recirculation equipment and, in the case of (DT), on the sludge concentration in the aeration basin.

In practical terms, the resultant of this notion of system dynamics is that it is necessary to modify the reaction times of the recirculation management in the event of a major change in the hydraulic flow (mainly rain).

When a sudden increase in the throughput is detected, it is not desirable to wait too long to increase the rate of recirculation, something which would accelerate the process of storing sludge in the clarifier. An immediate response by the management logic tool is thus desirable.

After a rain shower, if the reduction in the throughput is gradual, the automatic updating of the rate of recirculation will itself allow the sludge presently undergoing clarification to be gradually discharged. Conversely, if this reduction is sudden, the updated calculation will result in a low rate of recirculation, although a large amount of sludge is still undergoing clarification. Discharging will then be too lengthy and the actual retention time of the sludge will easily exceed about 12 hours. It is therefore necessary to continue the high-recirculation actions initiated during raining, and to maintain them until actual discharge of all of the sludge present in the clarifier. This forcing action lasts for a time which depends on the current conditions of the system—this forcing time is generally between 1 and 8 hours.

Figure 7:
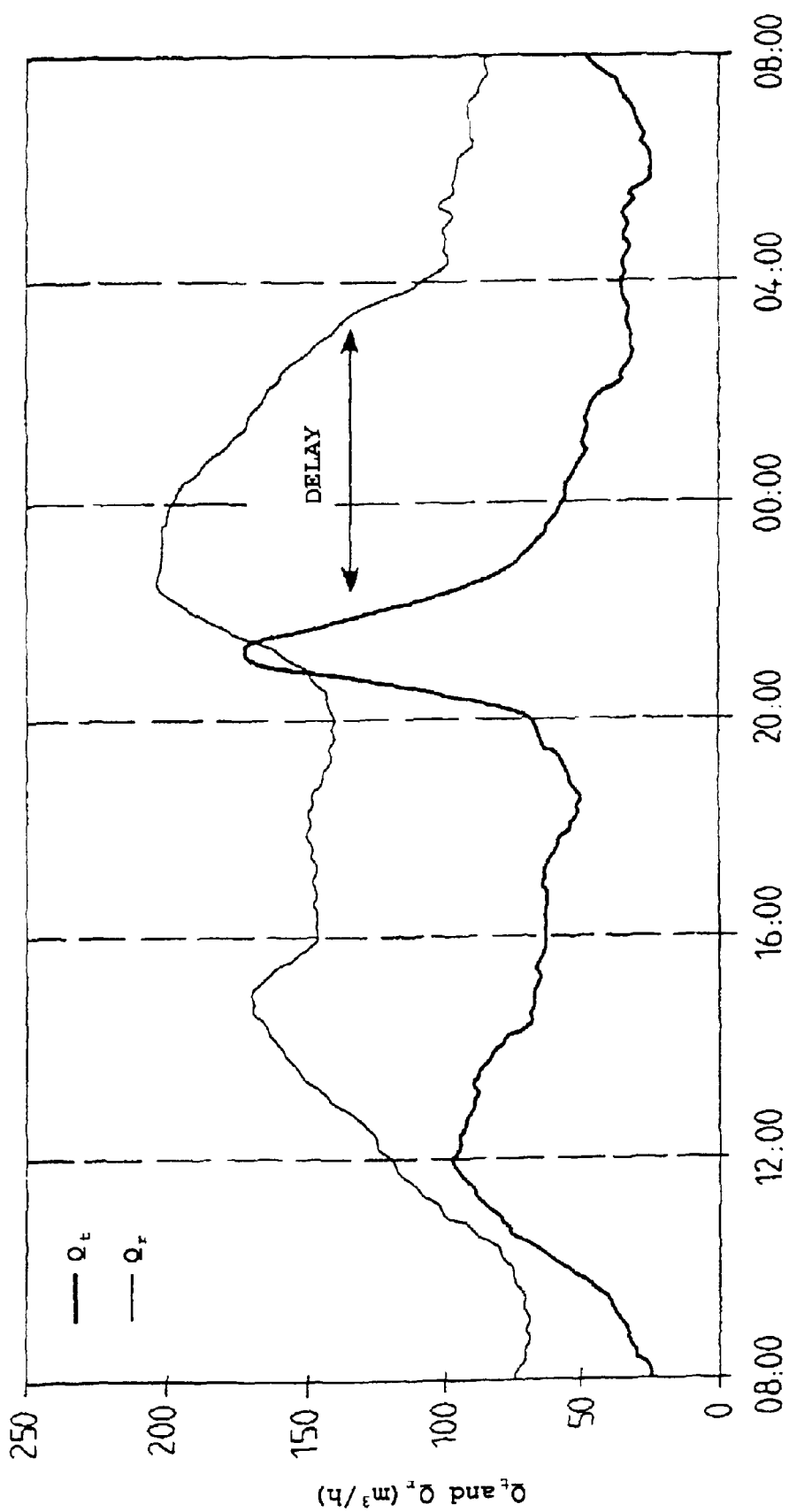
FIG. 7 is a curve illustrating the action of maintaining a high rate of recirculation for discharge after a rain shower.

FIG. 7 of the appended drawings, which illustrates the variation over time of the rate of recirculation ($Q_r$) and the throughput ($Q_t$), shows the action of maintaining a high rate of recirculation for discharging after a rain shower (regulation mode). An actual delay of 4 hours is needed to respond in this case to a decrease in the throughput.

3—Maintaining a constant sludge concentration in the recirculation line.

Maintaining a constant concentration of recirculated sludge makes it possible to help the operations when the sludge treatment system is fed via the recirculation line. Certain equipment starting the sludge treatment system, such as draining tables or screens, are subjected to feed charge regularity constraints, mainly for setting reasons and for reasons of adding stabilizers or flocculating agents.

Instantaneously matching the rate of recirculation to the hydraulic flow of the plant makes it possible to eliminate the variations in recirculated sludge concentrations caused by the effect of the peaks and troughs in the throughput and to smooth out the consequences of passing from the scraper bridge over the pipes for recycling the sludge undergoing clarification.

Furthermore, the syncopating of the recirculation pumps results in large variations in concentrations which limit the performance of the thickening equipment. The use of a frequency converter for supplying the recirculation pumps makes it possible on the other hand to vary the flow rates generated, while still maintaining continuity in the flows of recirculated sludge. The feed for the treatment system is thus matched, by means of the availability of a continuous and constant charge for the equipment.

Figure 8:
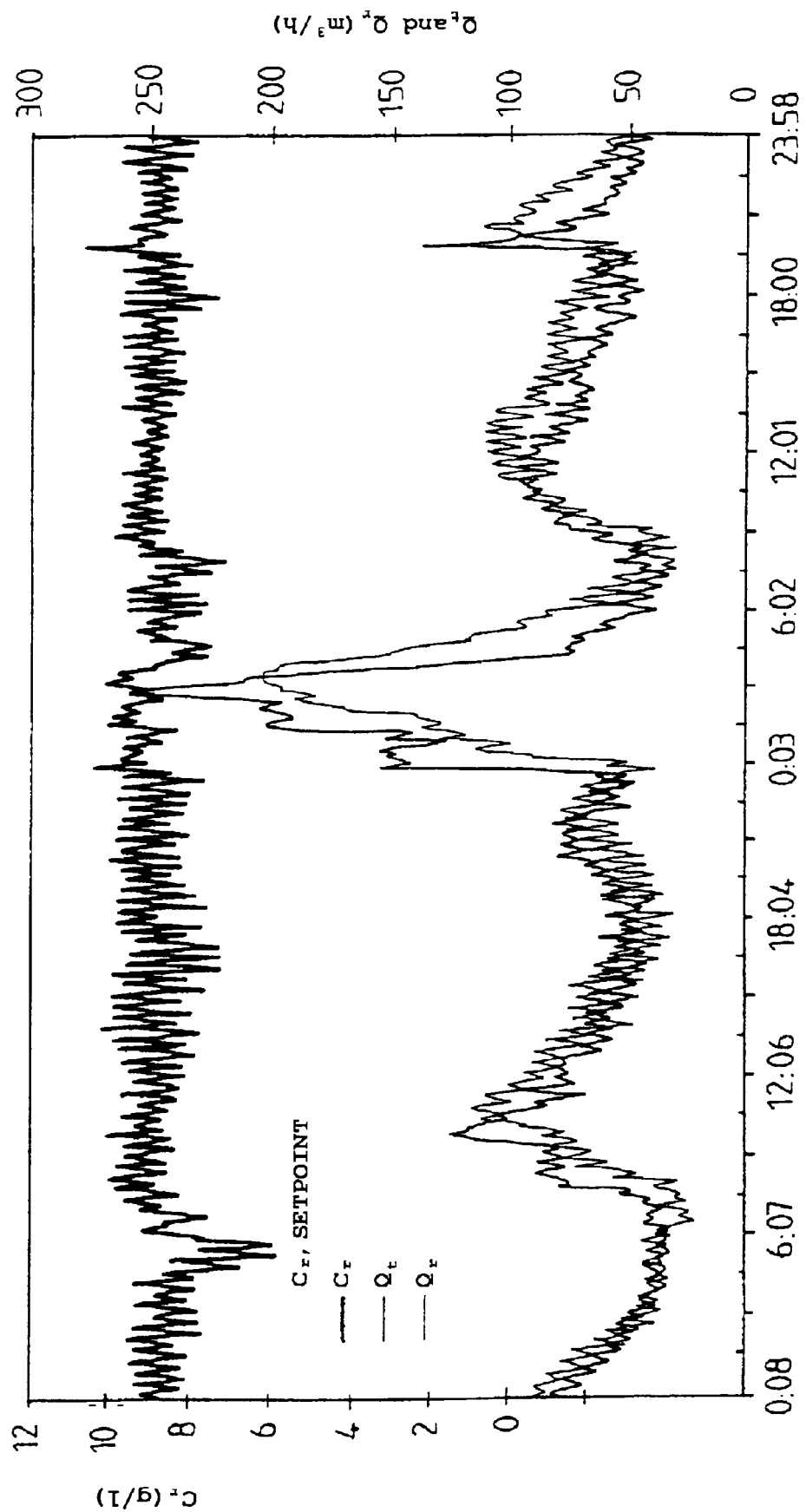
FIG. 8 is a graph illustrating the action of maintaining a constant sludge concentration in the recirculation line under rainy conditions.

FIG. 8 illustrates the variation over time of the sludge concentration ($C_r$) in the recirculation line, the throughput ($Q_t$) and the rate of recirculation ($Q_r$); these curves demonstrate the maintenance of a constant sludge concentration in the recirculation line in rainy conditions.

Figure 10:
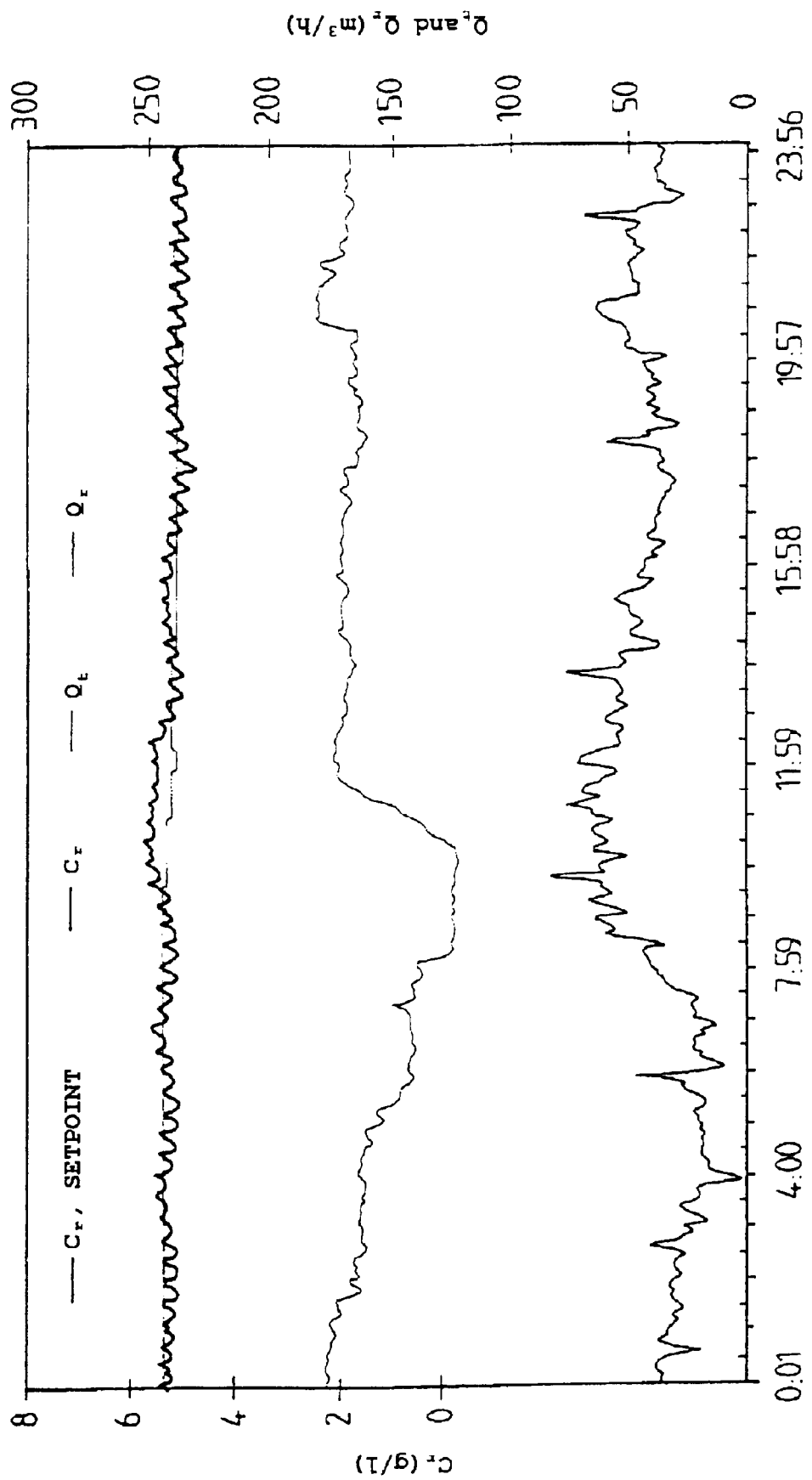
Figure 11:
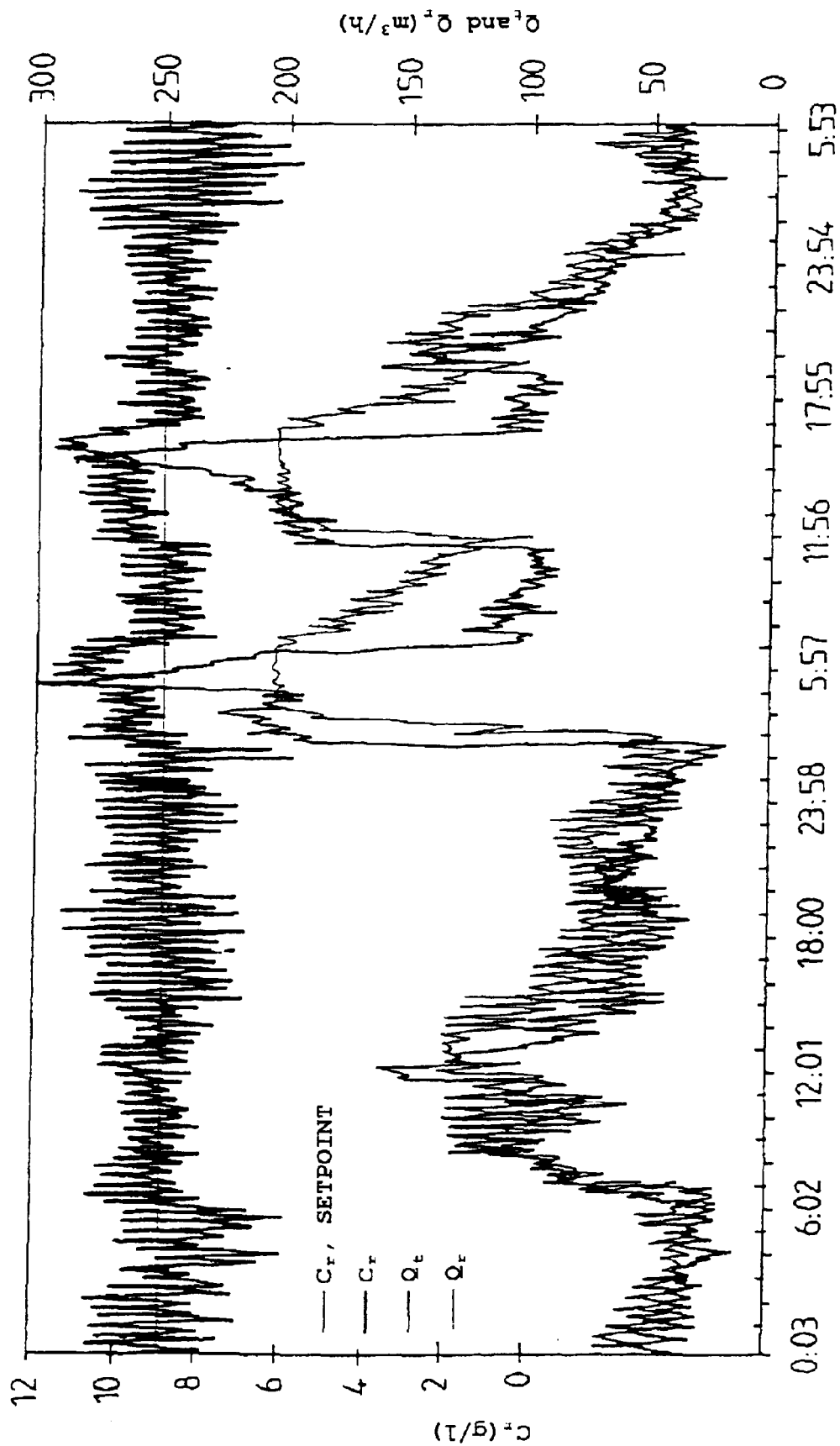
Figure 12:
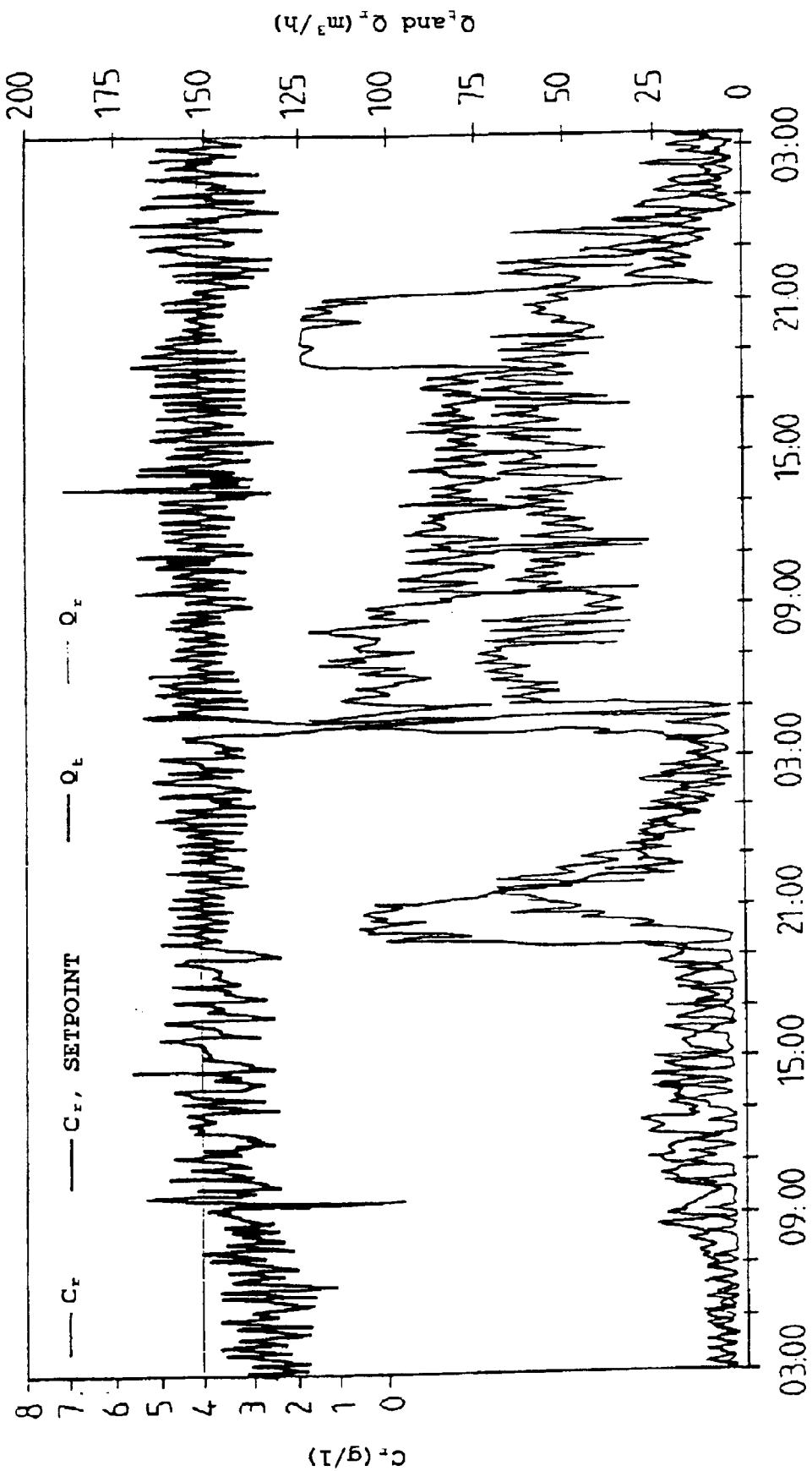

Reference is now made to FIGS. 9 to 12 which are recordings illustrating the operation of the process and of the apparatus according to the invention under conditions of, respectively:

dry weather, regulated mode (FIGS. 9 and 10);
rainy weather, regulated mode (FIGS. 11 and 12).

The interpretation of these various recordings, which allow the results provided by the invention to be clearly understood, will be explained below.

Typical Recordings in Dry Weather—Regulated Mode.

Figure 9:
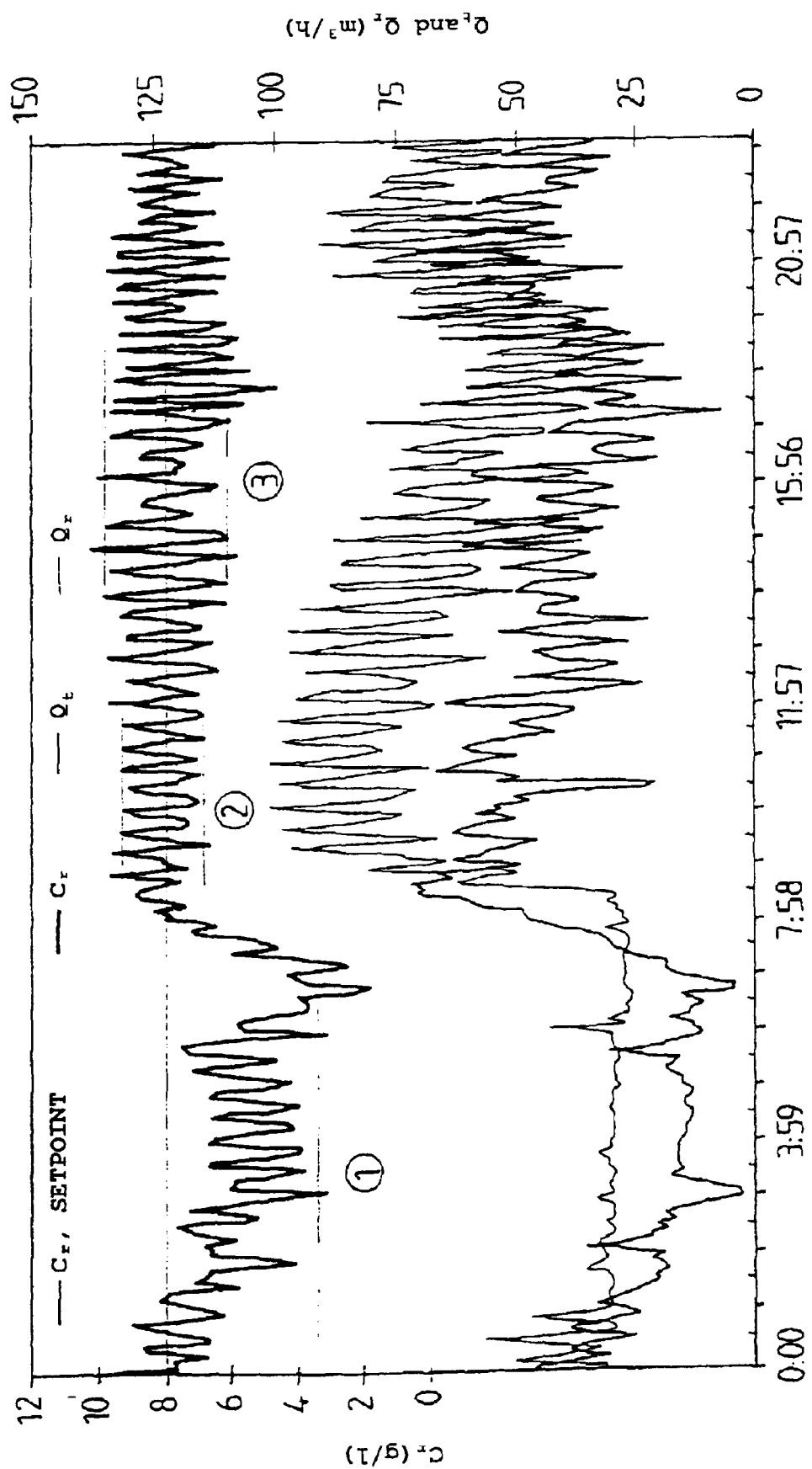
FIGS. 9 to 12 are recordings which illustrate the various methods of operating the process according to the invention under various conditions.

FIG. 9 shows the variation over time of the sludge concentration ($C_r$) in the recirculation line, the throughput ($Q_t$) and the rate of recirculation ($Q_r$) for a typical hydraulic flow in dry weather, the controller operating in regulated mode. This figure shows a normal variation over a period of one day in the flow entering the plant. The recirculation concentration setpoint of 8 g/l is maintained during the daytime, but the actual concentration is lower during the night. Periodic oscillations in the recirculation concentration are appreciable, their frequency of 25 minutes corresponding to the rotation time of the rotating bridge of the clarifier. In fact, it has been demonstrated that there are regions in the clarification structure where the sludge is present in greater or lesser amounts. Thus, when the bridge is located above the region for recovery from the sludge well, the recorded concentration increases, and decreases when the bridge is away from this region. This therefore causes the observed concentration variations.

During the night, corresponding to the annotation ❶ the concentration can no longer reach the setpoint concentration. It varies from 4 to 7 g/l since the minimum rate of recirculation is too high to allow the setpoint value to be reached.

When the flow rate becomes higher, during the peak at 8 h (annotation ❷), the concentration varies between 7 and 9 g/l and the controller therefore regulates, under these hydraulic conditions, the recirculation concentration between the setpoint concentration with a variation of plus or minus 1 g/l.

During the daytime, when the flow rate becomes low, for the times from 12 noon to 10 pm (annotation ❸), the recirculation concentration varies from 6.5 to 9.5 g/l. The controller increases its range of variation to plus minus 1.5 g/l.

These variations of 10 to 20% over the daytime are quite acceptable.

The concentration variations mentioned disappear after draining the clarifier. It has been seen that a mass of compact sludge fills most of the sludge recovery well located in the bottom of the structure. The scraper for this well also had to be pulled away. The solidified sludge was removed and a new scraper fitted. The concentration variations due to the rotation of the bridge are then no longer apparent. The corresponding recording is illustrated in FIG. 10. This figure corresponds to an ideal configuration for sludge recovery, in regulated mode, for a typical hydraulic flow in dry weather. However, it should be noted that the flows at night may be subjected to reductions in sludge concentration compared with the setpoint if the minimum rates of recirculation are reached.

Typical Recordings in Rainy Weather—Regulated Mode

FIG. 11 also shows the variation over time of the sludge concentration ($C_r$) in the recirculation line, the throughput ($Q_t$) and the rate of sludge recirculation ($Q_r$) in regulated mode, for hydraulic flows in rainy weather. This figure shows the variation in the concentration over two rainy days, the first day under conditions slightly modified with respect to the dry period, the second day under a high hydraulic flow. During the first day, the brief increase in flow rate to 150 m³/h around 2.00 pm forces the regulation by the controller to modify the rate of recirculation as a consequence, so as to maintain a sludge concentration at the desired setpoint. Again over this period, it is worth noting that there is a reduction in the amplitude of the concentration variations, which makes regulation easier when the clarifier is charged with sludge. The second day is characteristic of an extreme hydraulic flow. The controller remains in regulated mode and accompanies the large increase in throughput at around 3.00 am with an increase in the rate of recirculation up to saturation. Above this, the sludge concentrations in the recirculation line can no longer be controlled and lie above the setpoint. The situation restabilizes after the sudden reduction in throughput and the rate of recirculation remains high in order to hold the concentration setpoint in the recirculation line. The second hydraulic event at around 12 noon shows the same behaviour of the controller. It is worth noting that there is a phase lag between the throughput and the rate of recirculation as they gradually decrease, which illustrates the dynamics of the phenomena of sludge settling in the clarifier and of sludge transfer between the various structures.

The second example, illustrated by FIG. 12, illustrating curves similar to those in FIG. 11, shows the behaviour of the controller in regulated mode for two hydraulic events of identical magnitude but of different durations. The rates of recirculation increase up to the same value, the response of the controller is matched to the duration of the rain shower and in both cases there are phase lags. It should be noted that, compared with the first rain shower, the discharge time for the second event seems longer, since the duration of the hydraulic event has taken the plant to a completely steady state.

The process and apparatus for automated sludge recirculation management according to the invention are applicable to any purification plant employing an activated sludge process and having a clarifier allowing significant variations in the rate of sludge recirculation. No other technical constraint is mentioned in the case of the water treatment system.

According to one method of implementation, the homogeneity of the aeration basin is provided by separating the aeration from the stirring. If such homogeneity cannot be achieved, it is always possible to manage the sludge recirculation by the logic tool described above, provided that the information about the sludge concentration in the aeration basin is representative of the inflow of sludge into the clarifier, so as to calculate the balance between the incoming and outgoing masses of sludge in this structure. In addition, and by not taking into account the values of the sludge concentration ($C_{as}$) in the aeration basin, excluding aeration, it is still possible to estimate the total mass of sludge in the system.

The invention may be implemented either with single-tank aeration structures or with any multiple-tank plant configuration in the biological stage, with the proviso of re-establishing the equations for the balance between the mass of sludge flowing into the clarifier and the mass of sludge flowing out of it, and of possibly integrating the minimum and maximum flow constraints in certain structures. The presence of specific structures operating under anaerobic, anoxic or endogenous conditions, or the presence of multi-tank aeration structures, does not constitute an obstacle to implementation of the invention. The addition of sensors or meters for measuring sludge flow rates and concentrations may be necessary in the case of multiple biological tanks.

Likewise, the invention may be applied to a plant having either one secondary clarifier or several clarifiers, by providing sensors and control devices in all the sludge recirculation lines. If the balancing of the water treatment lines cannot be doubted, management in an identical mode may be accepted.

Furthermore, the control of the rates of recirculation may be managed by means of recirculation pumps supplied by a frequency converter, as described above; however, the use of other equipment (lifting screws, automated valves, etc.) may be envisaged.

Finally, there is no technical constraint on the sludge treatment system. For this system, it remains the case that the advantage of implementing the invention resides in supplying the equipment with extended flow, directly from the recirculation line (draining tables and screens).

Among the advantages provided by the present invention, mention may be made especially of the following:

Improvement in sludge quality with a reduction in the average value of the Mohlman index. This improvement results in the optimization of the results for the thickening and dehydration equipment in the sludge system (increase in the capacity and reduction in the operating time of the structures and equipment, improvement in the solids content and reduction in the volumes of sludge produced and in the cost of removing it, savings in the consumption of reactants, reduction in returns to the top, etc.). Potentially, this is the major aspect in reducing the operating costs.

Assistance in sludge treatment and elimination of draining malfunctions (organization of operating labour).

Conformity of the discharges (Water Agency Agreements and Premiums).

Prevention of malfunctions, especially under extreme operating conditions and during rain showers (organization of labour and elimination of malfunction handling costs).

Visual appearance of the clarifier (managing the image of the operation).

Of course, it remains to be stated that the present invention is not limited to the embodiments described and/or shown here, rather it encompasses all variants thereof.

What is claimed is:

1. Process for controlling the retention time of the sludge undergoing clarification in a process for treating wastewater by activated sludge comprising a recirculation of the activated sludge from the clarification stage into the biological basins, wherein the rate of sludge recirculation is varied so as to maintain a constant recirculated sludge concentration while at the same time guaranteeing a retention time of the sludge undergoing clarification of less than a critical value.

2. Process for controlling the retention time of the sludge undergoing clarification in a process for treating wastewater by activated sludge comprising a recirculation of the activated sludge from the clarification stage into biological basins, wherein the rate of sludge recirculation is varied so as to maintain a constant recirculated sludge concentration while at the same time guaranteeing a retention time of the sludge undergoing clarification of less than a critical value, and wherein the rate of sludge recirculation is varied according to a signal representative of the throughput of water passing through the plant, so as to limit the retention time of the sludge in the clarification stage.

3. Process for controlling the retention time of the sludge undergoing clarification in a process for treating wastewater by activated sludge comprising a recirculation of the activated sludge from the clarification stage into biological basins, wherein the rate of sludge recirculation is varied so as to maintain a constant recirculated sludge concentration while at the same time guaranteeing a retention time of the sludge undergoing clarification of less than a critical value;

wherein the rate of sludge recirculation is varied according to a signal representative of the throughput of water passing through the plant, so as to limit the retention time of the sludge in the clarification stage; and further wherein, when the validity of said signal is not recognized, the recirculation is controlled according to a fall-back method of managing the water treatment plant.

4. Process for controlling the retention time of the sludge undergoing clarification in a process for treating wastewater by activated sludge comprising a recirculation of the activated sludge from the clarification stage into biological basins, wherein the rate of sludge recirculation is varied so as to maintain a constant recirculated sludge concentration while at the same time guaranteeing a retention time of the sludge undergoing clarification of less than a critical value, and wherein the rate of sludge recirculation is varied according to a signal representative of the sludge concentration in the recirculation line, obtained from a sensor positioned in the recirculation line, this signal being delivered to an automated logic tool which varies the rate of recirculation according to the variation in the signal received, so as to keep the sludge concentration in the recirculation line constant, and in that, in the event of doubt about the representativeness of said signal, the sludge recirculation is controlled automatically according to a slaved management method whose objective is to limit the retention time of the sludge in the clarification stage, said slaved management method being managed on the basis of the analysis of the values of the sludge concentration in the biological basin and on the basis of the throughput of water passing through the plant.

5. Process according to claim 4, wherein, when the validity of the signal delivered by said sensor is not recognized, the recirculation is controlled according to fallback method of managing the water treatment plant.

6. Process for controlling the retention time of the sludge undergoing clarification in a process for treating wastewater by activated sludge comprising a recirculation of the activated sludge from the clarification stage into biological basins, wherein the rate of sludge recirculation is varied so as to maintain a constant recirculated sludge concentration while at the same time guaranteeing a retention time of the sludge undergoing clarification of less than a critical value, and wherein the volume of settled sludge is periodically measured so as to evaluate the sludge settling index and the sludge concentration in the biological basin and to determine the setpoint values for the management controller.

7. Process for controlling the retention time of the sludge undergoing clarification in a process for treating wastewater by activated sludge comprising a recirculation of the activated sludge from the clarification stage into biological basins; wherein the rate of sludge recirculation is varied so as to maintain a constant recirculated sludge concentration while at the same time guaranteeing a retention time of the sludge undergoing clarification of less than a critical value, and an automated logic tool for managing the sludge recirculation which is designed so as to:

(a) periodically update the average amount of sludge recirculation so as to adapt it to the conditions of the treatment plant, on the basis of the value of the sludge concentration in the aeration basin and on the basis of the re-updated settling index;

(b) respond instantly to the hydraulic events and manage the reaction delays according to the response time of the clarifier/aeration basin system by being based on the variation in the throughput; and (c) keep the sludge concentration in the recirculation line constant.

8. An apparatus for controlling the retention time of sludge undergoing clarification in the treatment of wastewater by activated sludge wherein there occurs a recirculation of the activated sludge from a clarifier into biological basins, and the rate of sludge recirculation is varied so as to maintain a constant recirculated sludge concentration while at the same time guaranteeing a retention time of the sludge undergoing clarification of less than a critical value, the apparatus comprising:

sensors making it possible, respectively, to measure a throughput;

means ensuring modulated control of said rate of activated sludge recirculation;

means for measuring the volume of the sludge that has settled and for evaluating a settling index and the sludge concentration in the biological basin;

a controller ensuring automated management of the recirculation, which comprises two main modules, served by a common signal-input stage:

a first module providing the interface between the user and the controller and making it possible to display a concentration setpoint;

a second module forming the unit for controlling the recirculation flow rates and comprising:

(a) a control logic tool for controlling the retention time of the sludge in the clarifier on the basis of the throughput, in order to calculate a signal for controlling the rate of recirculation;

(b) a module for managing the safety actions of the logic tool for managing the recirculation means; and (c) a stage involving the parameterization, reception, processing, analysis, and validation of the signals coming from the sensors and logic indicators of the operation of the equipment in order to supply said modules.

9. An apparatus for controlling the retention time of sludge undergoing clarification in the treatment of wastewater by activated sludge wherein there occurs a recirculation of the activated sludge from a clarifier into biological basins, and the rate of sludge recirculation is varied so as to maintain a constant recirculated sludge concentration while at the same time guaranteeing a retention time of the sludge undergoing clarification of less than a critical value, the apparatus comprising:

sensors making it possible, respectively, to measure:

(a) a sludge concentration in a line for recirculating the activated sludge from the clarifier into an aeration space;

(b) the sludge concentration in an aeration basin; and (c) a throughput;

means for ensuring modulated control of said rate of activated sludge recirculation;

means making it possible to measure the volume of the sludge that has settled and to evaluate a settling index;

a controller for ensuring automated management of the recirculation, which comprises three main modules, served by a common signal-input stage:

(d) a first module providing the interface between the user and the controller and making it possible to display a concentration set point;

(e) a second module forming the unit for controlling the recirculation rates and which comprises:

a control logic tool for ensuring control and regulation of the rate of recirculation on the basis of the measurement of the sludge concentration in order to keep the recirculation concentration constant;

a control logic tool for ensuring control of the retention time of the sludge in the clarifier on the basis of measurements of the sludge concentration in the aeration basin and of the throughput, in order to calculate a signal for controlling the rate of recirculation;

a module for managing the safety actions of the logic tool for managing the recirculation means; and (f) a third module for calculating the mass of sludge present in the clarifier/biological basin system for the purpose of fixing and setting a rate of extraction of the sludge; and a stage involving the parameterization, reception, processing, analysis, and validation of the signals coming from the sensors and logic indicators of the operation of the equipment in order to supply said modules.

10. Apparatus according to claim 9, wherein the first module is designed so as to allow manual information about measurements and desired setpoints, verification of compatibility between the constraints on the treatment process and the desired setpoints, together with display of the operating data and of information coming from the controller.

11. Apparatus according to claim 9, wherein said stage involving the parameterization, reception, analysis, processing, and validation of the signals receives, on the one hand, analog information from the various sensors used and, on the other hand, logic information relating to the operation of the equipment, such as recirculation pumps and their control systems and their aeration equipment.

12. Apparatus according to claim 9, comprising pumps for recirculating the sludge and wherein the output of said pumps is controlled by means of a frequency converter.

* * * * *